United States Patent
Griffin et al.

(10) Patent No.: US 7,084,378 B2
(45) Date of Patent: Aug. 1, 2006

(54) MASS-FLOW SENSOR HEATING ELEMENT PROTECTION METHOD AND APPARATUS

(75) Inventors: Joseph R. Griffin, Fenton, MI (US); Chris Ganseman, Zwevegem (BE); Patrick Van De Voorde, Loppem (BE); Nelson R. Burkholder, St. Thomas, PA (US); Stephen M. Geyer, State Line, PA (US)

(73) Assignees: Mack Trucks, Inc., Allentown, PA (US); Epiq, Sensor-Nite USA, Inc., Fenton, MI (US)

( * ) Notice: Subject to any disclaimer, the term of this patent is extended or adjusted under 35 U.S.C. 154(b) by 63 days.

(21) Appl. No.: 10/786,460

(22) Filed: Feb. 26, 2004

(65) Prior Publication Data

US 2005/0189343 A1    Sep. 1, 2005

(51) Int. Cl.
*H05B 1/02* (2006.01)
(52) U.S. Cl. .................. 219/494; 219/497; 219/492; 219/202; 219/205; 73/204.25; 73/204.18
(58) Field of Classification Search ........ 219/490–494, 219/497–501, 483–486, 202–205; 73/204.24, 73/204.25, 204.26, 204.18, 204.17
See application file for complete search history.

(56) References Cited

U.S. PATENT DOCUMENTS

| 4,821,700 | A | * | 4/1989 | Weibler et al. ............. 123/494 |
| 4,988,288 | A | * | 1/1991 | Melgaard .................... 432/72 |
| 5,353,774 | A | | 10/1994 | Furaya |
| 5,616,835 | A | | 4/1997 | Schnaibel et al. |
| 5,752,493 | A | | 5/1998 | Abe et al. |
| 5,782,227 | A | | 7/1998 | Abe |
| 6,304,813 | B1 | | 10/2001 | Ikeda et al. |
| 6,578,563 | B1 | | 6/2003 | Hada et al. |

* cited by examiner

*Primary Examiner*—Mark Paschall
(74) *Attorney, Agent, or Firm*—Rothwell, Figg, Ernst & Manbeck, PC

(57) ABSTRACT

A heating element protection apparatus for a mass-flow sensor may include a heating element disposed in a gas, a gas temperature sensor disposed in the gas to sense a temperature of the gas, a slope detector to measure a slope of the temperature as power is supplied to the heating element, and a heating element controller to supply power to the heating element to replace heat dissipated by the gas. The heating element controller may detect a temperature of the heating element and may supply power to the heating element based on the heating element temperature and the gas temperature, and the power may be switched off for a predetermined period of time if a magnitude of the slope is greater than a reference magnitude.

16 Claims, 2 Drawing Sheets

MASS-FLOW SENSOR HEATING ELEMENT PROTECTION METHOD AND APPARATUS

BACKGROUND OF THE INVENTION

1. Field of the Invention

The invention relates to mass-flow sensor heating elements in general, and to protecting heating elements in mass flow sensors from thermal shock.

2. Description of the Related Art

Emission control standards for internal combustion engines have tended to become more stringent over time. One type of emissions is known as oxides of nitrogen (NOx). Oxides of nitrogen tend to be produced by efficient, complete combustion. Efficient, complete combustion tends to be characterized by high combustion chamber temperatures. The heat associated with high combustion chamber temperatures acts as a catalyst, promoting the binding of oxygen in the air charge to the otherwise inert nitrogen and producing oxides of nitrogen. An engine that is running efficiently, therefore, may produce oxides of nitrogen. Controlling the amounts of emissions produced by an internal combustion engine, then, becomes an issue of balancing combustion efficiency against raising combustion temperatures high enough to produce oxides of nitrogen.

One way to control the production of oxides of nitrogen is to lower peak combustion chamber temperatures. Since production of oxides of nitrogen tends to depend on high combustion chamber temperatures as a catalyst, lowering the peak temperature ameliorates one of the conditions necessary for the production of oxides of nitrogen. Reducing the peak combustion chamber temperature may thus reduce the amount of oxygen that binds with nitrogen, with a consequent reduction in the quantity of oxides of nitrogen produced.

One way to lower the high combustion chamber temperatures produced by efficient combustion is to cool the combustion chamber during combustion. The combustion chamber may be cooled by, e.g. reintroducing some exhaust gas from previous combustion events back into the combustion chamber, a process known as exhaust gas recirculation (EGR). Since exhaust gas is composed primarily of water and carbon dioxide, neither of which is very flammable, reintroducing some exhaust gas has the effect of extinguishing combustion somewhat. The peak temperatures reached in the combustion chamber will consequently be lowered. The production of oxides of nitrogen may be retarded by lowering combustion chamber temperatures.

One way to reintroduce some exhaust gas into the combustion chamber is with external EGR. In external EGR, a conduit or plenum controlled by a valve conducts some exhaust gas from the exhaust manifold through a conduit back into the intake manifold. As the exhaust gases pass through the intake manifold they will mix with fresh makeup air coming in through the air cleaner and be distributed relatively evenly to each of the combustion chambers when its respective intake valve opens. If too much exhaust gas is readmitted to the intake manifold, combustion will be impaired. If too little exhaust gas is readmitted to the intake manifold, oxides of nitrogen will be produced. Clearly, the amount and timing of the introduction of exhaust gas to the intake manifold must be controlled accurately to control emissions without impairing the performance of the engine.

One way to monitor the amount of exhaust gas passing through an EGR conduit on the way to the intake manifold is with a mass flow sensor. A mass flow sensor may consist of a heating element, such as a resistance heating element, that is exposed to the exhaust gases flowing in the conduit. A resistance heating element produces heat from resistance to an electrical current flowing through it. Heat produced by the heating element may be transferred to the exhaust gas flowing around it through conduction, convection, or radiation.

The heat transferred to the exhaust gas is related to, inter alia, the rate of mass flow of the exhaust gas and the difference between the temperatures of the heating element and the exhaust gas. Convection, in particular, may be a function of the rate of mass flow of the exhaust gas, while conduction and radiation may be functions of the difference between the temperatures of the heating element and the exhaust gas. Since the electrical power dissipated by the ceramic element is proportional to the heat dissipated by the ceramic element, and consequently to the rate of mass flow of the exhaust gas, a heating element may be used to measure the rate of mass flow by maintaining the heating element at a constant temperature and measuring the power required to replace the heat dissipated by the exhaust gas.

The heating element may be made of a combination of a metal, such as platinum, on a ceramic substrate, such as alumina. The ceramic substrate will have high thermal inertia and will withstand high temperatures without melting, while the metal will conduct the electricity to be dissipated as heat. The ceramic thus supports the metal while it is exposed to the high temperature exhaust gases, while allowing the metal to dissipate heat into the exhaust gas. The heating element may be a thick film platinum-on-alumina Positive Temperature Coefficient (PTC) that is kept at a relatively high temperature of, e.g. approximately 400° C. The pyrolytic cleaning associated with high heating element temperature may prevent the accumulation of soot particles. An accumulation of soot particles could change the heat transfer properties of the heating element.

The heat transferred to the exhaust gas may be replaced by electrical power dissipated by the heating element. The power necessary to maintain the heating element at the set-point temperature is a function of the exhaust gas mass flow and the temperature difference between the heating element and the exhaust gas:

$$\text{Power} = \text{function}(\text{Mass Flow}, T_{heating\ element} - T_{gas}).$$

The greater the gas flow, in general, the more heat is dissipated. Similarly, the greater the difference between the temperatures of the heating element and the exhaust gas, the more heat is dissipated. Since both the mass flow rate and the difference between the temperatures of the heating element and the exhaust gas have an effect on the amount of heat that is dissipated, the heat attributable to the difference in temperatures should be subtracted from the total heat dissipated when the rate of mass flow is measured. A temperature sensor may be placed in the exhaust flow to measure the exhaust gas temperature. The exhaust gas temperature may be used to compensate for electrical power dissipated due to the difference between the temperatures of the heating element and the exhaust gas. The temperature sensor may be a thin film PT200 platinum Resistive Temperature Device (RTD), which is mounted on an alumina substrate.

A remotely mounted electronic control module may control the heating element temperature, read the exhaust gas temperature, and transmit an exhaust gas mass flow signal, an exhaust gas temperature, and diagnostic fault codes, which may be used to control the amount and timing of exhaust gas readmitted to the intake manifold.

A heating element in an EGR conduit from the exhaust manifold to the intake manifold will be exposed to extremes of temperature. Heavy duty truck diesel engines tend to be turbo-charged or supercharged, so a positive pressure may exist in the intake manifold when the engine is running. Some of the cold intake air will thus be forced up the EGR conduit to surround the heating element while the EGR valve remains closed. Once the engine has warmed up enough to call for EGR, however, the EGR valve will open and the formerly cold intake air in the conduit will be replaced with exhaust gases at near combustion chamber temperatures. A heating element placed on a downstream side of the EGR valve will thus be exposed to cold intake air in the intake manifold until the EGR valve opens, after which it will be exposed to hot exhaust gases.

The switch from cold intake air to hot exhaust gases may occur substantially instantaneously upon opening of the EGR valve, since exhaust gases exit the combustion chamber at high pressure against a back pressure in the exhaust system. A mass-flow sensor that samples temperatures at regular intervals may miss a temperature rise of this nature. Furthermore, the difference in temperature between the cold intake air and the hot exhaust gases may be dramatic. A heating element in a truck that is started after being parked overnight in Bemidji, Minn., for example, may go from a −40° C. environment to over 400° C. upon opening of the EGR valve. Since the heating element is ceramic, and ceramic materials possess significant thermal inertia, thermal stresses may be produced in the heating element. A tip of a heating element may, for example, heat faster than a base, since a tip has more surface area. Similarly, if flow in the EGR conduit is laminar, the portion of the heating element in the center of the conduit will presumably heat faster than the portion near the wall, since flow will be higher in the center. If the switch from cold intake air to hot exhaust gases occurs quickly enough, the thermal stresses may amount to thermal shock in the heating element. If the thermal shock is severe enough, the ceramic heating element may crack. Condensation from the intake air or from cold exhaust gases left in the EGR conduit may enter these cracks and freeze while the engine is shut down. Since water expands when it freezes, condensate freezing inside cracks in the ceramic heating element may cause the cracks to propagate, leading to premature failure of the heating element.

Since ceramic is chosen for its high thermal inertia, the rate at which heat from the EGR is applied to the heating element may be a significant contributing factor in the failure mode of the heating element. A high thermal inertia may promote the formation of local hot spots in the ceramic heating element. The thermal gradients surrounding these hot spots may produce thermal stresses as the hotter material expands more than adjacent cooler material. A ceramic heating element that may tolerate a shift from a low temperature to a high temperature if heat is applied gradually may not tolerate the same rise in temperature if heat is applied quickly. Furthermore, fatigue of the heating element may be exacerbated by thermal cycling associated with abrupt temperature changes.

A heater element may fail if the platinum electrode material overheats or if thermal cracks form in the ceramic substrate. In either case, the electrical resistance of the heating element may increase suddenly, above its set point value. As a result, the heater control circuit will detect an out of range resistance value for the heater circuit and proper heater temperature control will not be possible. The final result will be the loss of the mass flow signal.

SUMMARY OF THE INVENTION

In several embodiments of the invention, a ceramic heating element may be protected from thermal shock or overheating during cold start and other conditions where condensed water/ice could be present on the heating element or in the exhaust during initial start up or low temperature operation or any other operating condition where the heating element is in contact with a liquid or frozen medium.

In a first aspect of the invention, a heating element protection apparatus for a mass-flow sensor may include a heating element disposed in a gas, a heating element controller may supply power to the heating element to replace heat dissipated by the gas, a slope detector may measure a slope of a temperature of the heating element as power is supplied to the heating element, and the power may be switched off for a predetermined period of time if a magnitude of the slope is greater than a reference magnitude.

In a second aspect of the invention, a method of protecting a heating element for a mass-flow sensor may include disposing a heating element in a gas, suppling power to the heating element to replace heat dissipated by the gas, detecting a temperature of the heating element, measuring a slope of the temperature of the heating element with a slope detector as power is supplied to the heating element, and switching off the power for a predetermined period of time if a magnitude of the slope is greater than a reference magnitude.

In a third aspect of the invention, a system of protecting a heating element for a mass-flow sensor may include means for disposing a heating element in a gas, means for suppling power to the heating element to replace heat dissipated by the gas, means for detecting a temperature of the heating element, means for measuring a slope of the temperature of the heating element as power is supplied to the heating element, and means for switching off the power for a predetermined period of time if a magnitude of the slope is greater than a reference magnitude.

DETAILED DESCRIPTION OF THE PREFERRED EMBODIMENTS

Since the rate at which the temperature of the heating element changes may be a significant contributing factor in the failure mode of the heating element, it may be desirable to measure the slope of the change of temperature of the heating element and protect the heating element from damage by shutting it down if a magnitude of the slope is too large. Furthermore, since the high thermal inertia of a ceramic heating element may promote the formation of local hot spots and lead to cracking, it may be desirable to measure the slope of the change of temperature of the heating element and protect the heating element from damage by shutting it down if the magnitude of the slope is too large. Furthermore, since a ceramic heating element that tolerates a shift between a low temperature and a high temperature if heat is applied gradually may not tolerate the same rise in temperature if heat is applied quickly, it may be desirable to measure the slope of the change of temperature of the heating element and protect the heating element from damage by shutting it down if the magnitude of the slope is too large. Furthermore, since voltage transients or large changes in exhaust gas flow rate may overheat the heating element, it may be desirable to measure the slope of the change of temperature of the heating element and protect the heating element from damage due to overshooting by shutting it down if the magnitude of the slope is too large. Finally, since the platinum may be over-heated or the alumina substrate thermally cracked due to exposure to liquid/ice or other dynamic conditions, it may be desirable to measure the slope of the change of temperature of the heating element and protect the heating element from damage by shutting it down if the magnitude of the slope is too large.

Figure 1:
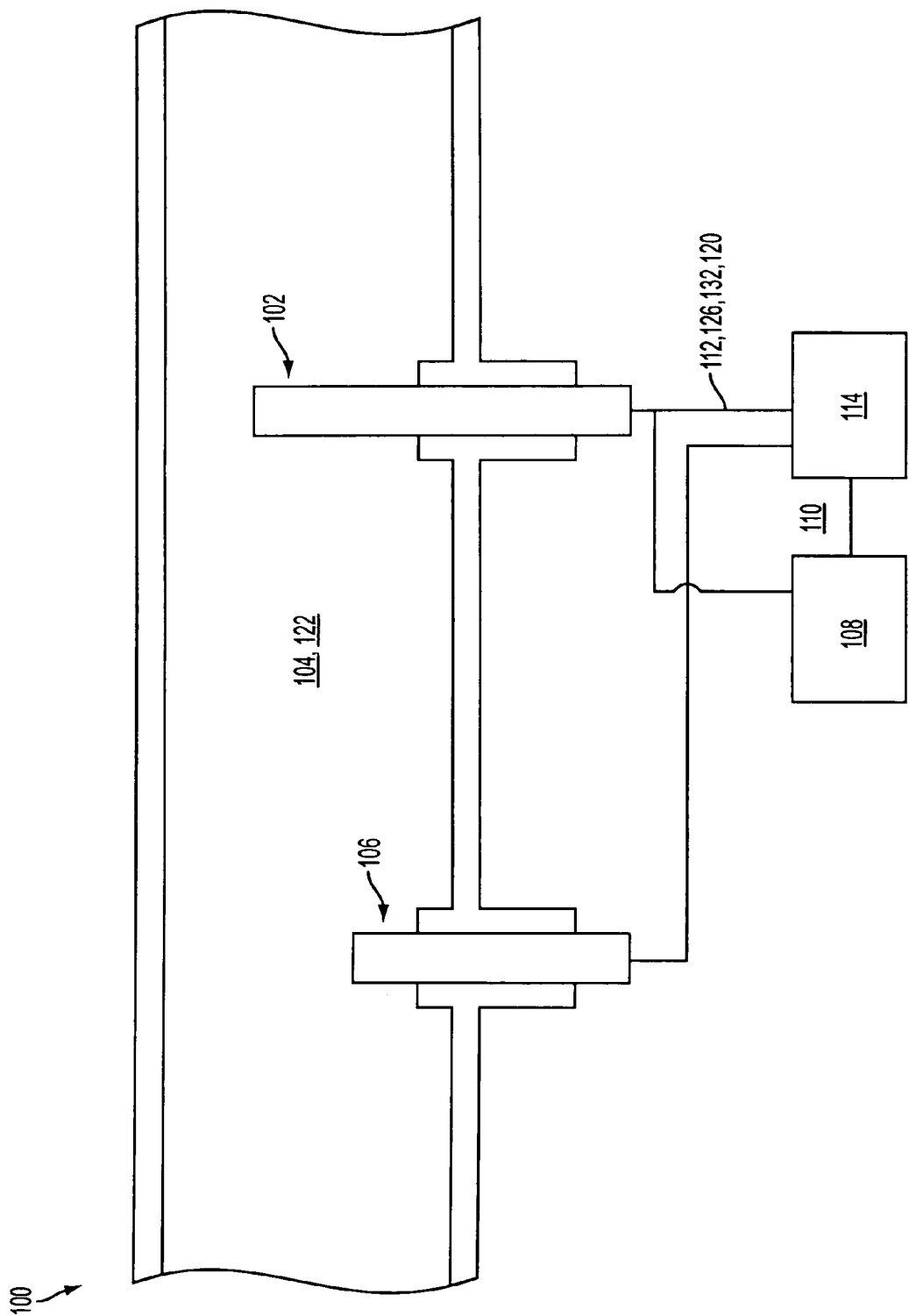
FIG. 1 is a schematic diagram of a heating element protection apparatus according to an embodiment of the invention.
Figure 2:
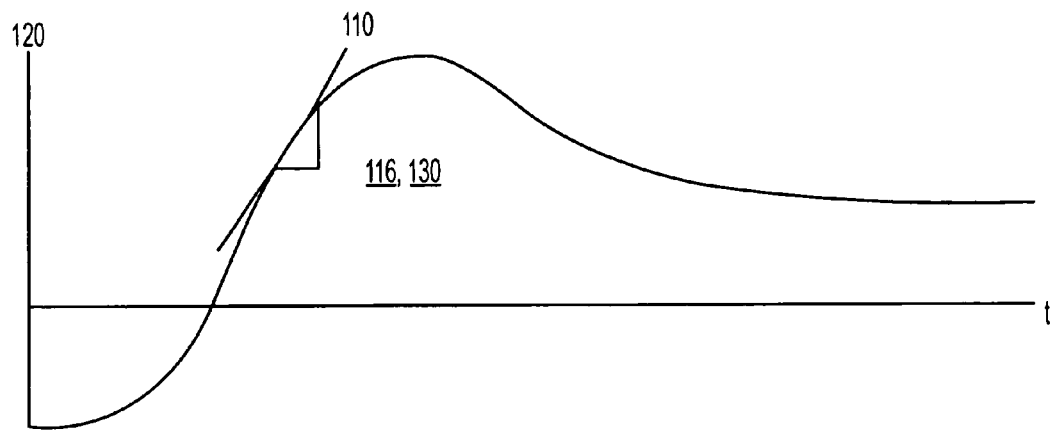
FIG. 2 is a graph of heating element temperature vs. time for a heating element protection apparatus according to an embodiment of the invention.
Figure 3:
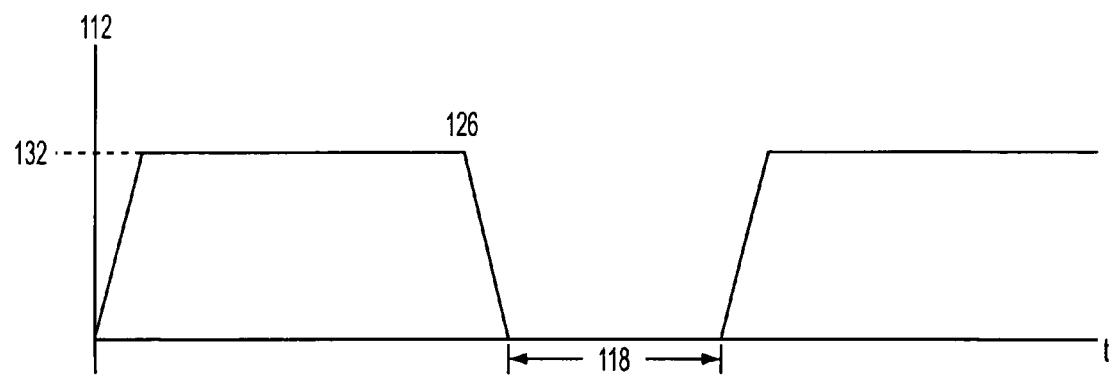
FIG. 3 is a graph of power vs. time for a heating element protection apparatus according to an embodiment of the invention.

In FIG. 1 is shown a heating element protection apparatus for a mass-flow sensor 100 according to a first embodiment of the invention. Mass-flow sensor 100 may include a heating element 102 disposed in a gas 104. A heating element controller 114 may supply power 112 to heating element 102 to replace heat dissipated by convection, conduction, or radiation to gas 104.

Since a rate of mass flow of gas 104 is proportional primarily to heat dissipated by convection, heating element controller 114 may assess the difference between a temperature 120 of heating element 102 and the gas temperature to compensate for the heat dissipated by conduction and radiation. In one embodiment, a gas temperature sensor 106 may be disposed in gas 104 to sense temperature 122 of gas 104. In this embodiment heating element controller 114 may detect temperature 120 of heating element 102 and may supply power 112 to heating element 102 based on heating element temperature 120 and gas temperature 122. In another embodiment heating element controller 114 may compensate for conduction of heat to gas 104 in proportion to the difference between heating element temperature 120 and gas temperature 122. In another embodiment heating element controller 114 may compensate for radiation of heat to gas 104 in proportion to the fourth power of the difference between heating element temperature 120 and gas temperature 122.

A slope detector 108 may measure a slope 110 of heating element temperature 120 while power 112 is being supplied to heating element 102. In one embodiment, slope 110 may be an instantaneous slope. In one embodiment, slope detector 108 may measure a tangent 116 of heating element temperature 120, and the magnitude 130 of slope 110 may be a magnitude of tangent 116. In several embodiments, magnitude 130 may be denominated in Watts per second (W/s) or ° C. per second (° C./s). In one embodiment, power 112 may be switched off for a predetermined period of time 118 if a magnitude 130 of slope 110 is greater than a reference magnitude M. In one embodiment, an open loop ramp up may be restarted after power 112 has been switched off for predetermined period of time 118. In one embodiment, power 112 may be a power signal 126 having an amplitude 132. In one embodiment, amplitude 132 may be measured in Watts (W).

In one embodiment, there may be two modes of operation of heating element controller 114. The first mode, open loop control of heating element controller 114, may be used during initial cold start of heating element 102. In open loop mode heating element 102 may be warmed up based on heating element temperature 120, amplitude 132 of power signal 126, and magnitude 130 of slope 110. In one embodiment, heating element 102 may be warmed up in a controlled manner from ambient temperature to about 380° C. during the initial start up. The second mode, closed loop control of heating element controller 114, may be used during normal operation of heating element 102. In closed loop mode heating element 102 may be controlled based on heating element temperature 120 and amplitude 132 of power signal 126.

In one embodiment, reference magnitude M may be 500° C./second. In one embodiment, power 112 may be switched off for a predetermined period of time 118 if a magnitude 130 of slope 110 is greater than 100° C./second and amplitude 132 is greater than 3 W. In one embodiment, power 112 may be switched off for a predetermined period of time 118 if a magnitude 130 of slope 110 is greater than 500° C./second and amplitude 132 is greater than 3 W.

In one embodiment, power 112 may be switched off for predetermined period of time 118 if heating element temperature 120 is greater than about 450° C. In another embodiment power 112 may be switched off for predetermined period of time 118 if heating element temperature 120 is less than about 350° C. In another embodiment power 112 may be switched off for predetermined period of time 118 if power 112 is greater than about 30 watts. In one embodiment, predetermined period of time 118 may be between about one and three seconds. In another embodiment predetermined period of time 118 may be about two seconds.

In one embodiment, amplitude 132 may be limited to 10 W while heating element temperature 120 is below 175° C. In another embodiment power 112 may be switched off for predetermined period of time 118 if heating element temperature 120 does not exceed 175° C. within 15 seconds after open loop ramp up start while limiting amplitude 132 to 10 W. In one embodiment, amplitude 132 may be limited to a maximum of 30 W in all conditions. In one embodiment, the heating element temperature 120 may be controlled to a constant 400° C. under normal conditions.

In a second embodiment of the invention a method of protecting a heating element 100 for a mass-flow sensor 100 may include the steps of disposing a heating element 102 in a gas 104, detecting a temperature 120 of heating element 102, disposing a gas temperature sensor 106 in gas 104, sensing a temperature 122 of gas 104, supplying power 112 to heating element 102 to replace heat dissipated by gas 104 based on heating element temperature 120 and gas temperature 122, measuring a slope 110 of power 112 with a slope detector 108 as it is supplied to heating element 102, and switching off power 112 for a predetermined period of time 118 if a magnitude of slope 110 may be greater than a reference magnitude M. In one embodiment, the method of protecting a heating element 100 for a mass-flow sensor 100 may further include the step of restarting an open loop ramp up.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A heating element protection apparatus for a mass-flow sensor comprising:

a heating element for a mass-flow sensor disposed in an exhaust gas recirculation (EGR) conduit for a combustion engine being exposed to a gas;

a heating element controller supplying power to the heating element to replace heat dissipated by said gas;

a slope detector for measuring a slope of a temperature of said heating element as power is supplied to said heating element;

wherein the power is switched off for a predetermined period of time if a magnitude of the slope is greater than a reference magnitude.

2. The heating element protection apparatus for a mass-flow sensor of claim 1, further comprising a gas temperature sensor disposed in said gas to sense a temperature of said gas;

wherein the heating element controller detects a temperature of said heating element and supplies power to the heating element based on said heating element temperature and said gas temperature.

3. The heating element protection apparatus for a mass-flow sensor of claim 1, wherein after the power is switched off for said predetermined period of time an open loop ramp up is restarted.

4. The heating element protection apparatus for a mass-flow sensor of claim 1, wherein said reference magnitude is 500° C./second.

5. The heating element protection apparatus for a mass-flow sensor of claim 1, wherein said predetermined period of time is between about one and three seconds.

6. The heating element protection apparatus for a mass-flow sensor of claim 1, wherein:

said temperature is an electrical signal;

said slope detector measures a tangent of said electrical signal; and said magnitude of said slope is a magnitude of said tangent.

7. The heating element protection apparatus for a mass-flow sensor of claim 1, wherein the power is switched off for said predetermined period of time if said heating element temperature is greater than about 450° C.

8. The heating element protection apparatus for a mass-flow sensor of claim 1, wherein the power is switched off for said predetermined period of time if said heating element temperature is less than about 350° C.

9. The heating element protection apparatus for a mass-flow sensor of claim 1, wherein the power is switched off for said predetermined period of time if said power is greater than about 30 watts.

10. The heating element protection apparatus for a mass-flow sensor of claim 1, wherein said slope is an instantaneous slope.

11. A method of protecting a heating element for a mass-flow sensor, the method comprising:

disposing a heating element for a mass-flow sensor in an exhaust gas recirculation (EGR) conduit for a combustion engine;

detecting a temperature of said heating element;

supplying power to the heating element to replace heat dissipated by said gas;

measuring a slope of said temperature with a slope detector as said power is supplied to said heating element; and switching off the power for a predetermined period of time if a magnitude of the slope is greater than a reference magnitude.

12. The method of protecting a heating element for a mass-flow sensor of claim 11, the method comprising further:

disposing a gas temperature sensor in said gas;

sensing a temperature of said gas; and supplying power to the heating element to replace heat dissipated by said gas based on said heating element temperature and said gas temperature.

13. The method of protecting a heating element for a mass-flow sensor of claim 11, the method comprising further restarting an open loop ramp up.

14. A system of protecting a heating element for a mass-flow sensor comprising:

means for disposing a heating element for a mass-flow sensor in an exhaust gas recirculation (EGR) conduit for a combustion engine;

means for detecting a temperature of said heating element;

means for supplying power to the heating element to replace heat dissipated by said gas;

means for measuring a slope of said temperature as said power is supplied to said heating element; and means for switching off the power for a predetermined period of time if a magnitude of the slope is greater than a reference magnitude.

15. The system of protecting a heating element for a mass-flow sensor of claim 14, the system comprising further:

means for disposing a gas temperature sensor in said gas;

means for sensing a temperature of said gas; and means for supplying power to the heating element to replace heat dissipated by said gas based on said heating element temperature and said gas temperature.

16. The system of protecting a heating element for a mass-flow sensor of claim 14, the system comprising further means for restarting an open loop ramp up.

* * * * *